(12) United States Patent
Evcuemen et al.

(10) Patent No.: US 10,857,497 B2
(45) Date of Patent: Dec. 8, 2020

(54) FLANGE, FILTER INSERT, DEVICE FOR SEPARATING OIL AEROSOL FROM AIR, AND METHOD FOR PRODUCING A FILTER INSERT

(71) Applicant: MANN+HUMMEL GmbH, Ludwigsburg (DE)

(72) Inventors: Goekhan Evcuemen, Hanhofen (DE); Mischa Winter, Bruehl (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 214 days.

(21) Appl. No.: 16/151,538

(22) Filed: Oct. 4, 2018

(65) Prior Publication Data
US 2019/0105592 A1   Apr. 11, 2019

(30) Foreign Application Priority Data

Oct. 6, 2017   (DE) .................. 10 2017 009 289

(51) Int. Cl.
*B01D 46/24*   (2006.01)
*B01D 46/00*   (2006.01)
*B01D 46/42*   (2006.01)

(52) U.S. Cl.
CPC ..... *B01D 46/2414* (2013.01); *B01D 46/0005* (2013.01); *B01D 46/4227* (2013.01); *B01D 2271/022* (2013.01)

(58) Field of Classification Search
CPC ............ B01D 46/2414; B01D 46/4227; B01D 2271/022; B01D 46/0005; B01D 46/0002
See application file for complete search history.

(56) References Cited

U.S. PATENT DOCUMENTS

| | | | | |
|---|---|---|---|---|
| 5,605,555 | A * | 2/1997 | Patel ................ | B01D 46/2414 55/502 |
| 6,065,702 | A | 5/2000 | Mochizuki et al. | |
| 6,093,231 | A * | 7/2000 | Read ................ | B01D 46/0024 55/498 |
| 6,136,076 | A * | 10/2000 | Read ................ | B01D 46/0005 55/480 |
| 6,256,851 | B1 | 7/2001 | Goedelmann et al. | |
| 6,485,535 | B1 * | 11/2002 | Linnersten ......... | B01D 46/0004 55/319 |
| 7,097,683 | B2 * | 8/2006 | Eppel ................ | B01D 46/0031 55/423 |

(Continued)

*Primary Examiner* — Robert Clemente
(74) *Attorney, Agent, or Firm* — James Hasselbeck

(57) ABSTRACT

A flange for a filter insert for separating oil aerosol from air has a flange region with radial contact surface for supporting the flange; an axial first wall region adjoining radially inwardly the flange region; a radial cover region adjoining an end of the first wall region opposite the flange region; a second axial wall region adjoining radially inwardly the cover region and surrounding a central cutout. Radial lifting regions adjoin an end of the second wall region opposite the cover region and extend into the central cutout. First and second wall regions and cover region are concentric to each other. The lifting regions are arranged exclusively in a radially outer region of the central cutout. A coaxial imaginary circle with outer circumference defined by radially innermost points of the lifting regions has a radius of at least three fourths of a radius of the second wall region.

5 Claims, 7 Drawing Sheets

(56) References Cited

U.S. PATENT DOCUMENTS

| | | | | |
|---|---|---|---|---|
| 7,588,615 B2* | 9/2009 | Gillenberg | ............. | B01D 27/08 55/423 |
| 8,152,887 B2* | 4/2012 | Patel | ..................... | B01D 46/50 55/485 |
| 9,233,330 B2* | 1/2016 | Dworatzek | ........ | B01D 46/0005 |
| 2005/0044827 A1* | 3/2005 | Eppel | ..................... | F16N 39/06 55/423 |
| 2010/0147153 A1* | 6/2010 | Patel | ................. | B01D 46/2411 96/190 |
| 2014/0338295 A1* | 11/2014 | Dworatzek | ........ | B01D 46/0002 55/502 |
| 2016/0220935 A1 | 8/2016 | Ruhland et al. | | |

* cited by examiner

Stand der Technik / prior art

Stand der Technik / prior art

Stand der Technik / prior art

FLANGE, FILTER INSERT, DEVICE FOR SEPARATING OIL AEROSOL FROM AIR, AND METHOD FOR PRODUCING A FILTER INSERT

BACKGROUND OF THE INVENTION

The invention concerns a flange for a filter insert configured for separating oil aerosol from air, wherein the flange in cross section is annular and in longitudinal section is of a stepped configuration and comprises a central cutout. The flange comprises regions arranged concentrically relative to each other, namely a flange region, a first wall region, a cover region, an additional (second) wall region, and at least two lifting regions configured for holding the flange. The flange region is comprised of a radially extending contact surface which is configured for supporting the flange. The first wall region adjoins radially in inward direction the flange region and extends axially. The cover region adjoins the end of the first wall region facing away from the flange region and extends radially. The additional (second) wall region adjoins radially in inward direction the cover region, extends axially, and surrounds the central cutout of the flange. The lifting regions adjoin the end of the additional (second) wall region facing away from the cover region and extend radially in inward direction into the central cutout of the flange.

The invention concerns also a filter insert for installation in a device for separating oil aerosol from air, comprising at least one separating element, configured for separating oil aerosol from air, in the form of a cylinder-shaped coalescer, wherein the separating element is arranged about a support pipe configured for supporting the separating element, and wherein the filter insert comprises a flange of the aforementioned kind.

The invention also concerns a method for producing such a filter insert.

The invention also concerns a device for separating oil aerosol from air comprising a filter insert of the aforementioned kind.

Devices for separating oil aerosol from air can be employed, for example, for removing oil from compressed air in compressed air systems which are being supplied through an oil-lubricated connecting element, for example, of a compressor or of a vacuum pump. Such devices are disclosed, for example, in DE 10 2014 002 719 A1 as well as DE 197 45 924 A1. Such a device for separating oil aerosol from air comprises an air-oil separator configured for separating oil from air and a pressure container or pressure storage container, for example, of a compressor. The air-oil separator has a coalescing medium and a flange. In the position of use, the air-oil separator is exchangeably arranged in the pressure container wherein the flange is held and usually seal-tightly clamped between the pressure container bottom part and the pressure container cover. Another application possibility of devices for separating oil aerosols from air is oil removal from crankcase gases of an internal combustion engine.

The air laden with oil flows through a raw air inlet into the housing or into the pressure container in order to subsequently flow through the filter insert that comprises at least one filter element or separating element configured for separating oil from the raw air, for example, a main separator and a post separator, and to finally exit in the purified state from the housing through the clean air outlet.

The filter insert functions according to the coalescence principle. The at least one hollow cylindrically embodied filter element is configured as an annular coalescer that coalesces the fine oil droplets to larger oil drops that precipitate downwardly due to the force of gravity in the air-oil separator and downstream thereof. The precipitated oil drops are drained off.

FIGS. 10 to 12 show a prior art flange 100' of an air-oil separator which comprises a coalescing medium. The air-oil separator is mounted exchangeably in a pressure container of a compressor wherein the flange 100' is held and seal-tightly clamped between the pressure container bottom part and the pressure container cover. For facilitating manipulation of this air-oil separator, in particular to be able to insert the air-oil separator more easily into the pressure container of the compressor and remove it therefrom, the flange 100' has two lifting grips 50'. These lifting grips 50' extend transversely through the central cutout 60 of the flange 100'. The free surface area of the central cutout 60 of the flange 100' is thus obstructed. Thus, less space is available, for example, in order to pass oil drainage elements that are configured to discharge the separated oil through the central cutout 60. The flange with lifting grips 50' which is shown in FIGS. 10 to 12 can only be held manually. Thus, the filter insert can be lifted only by hand out of the pressure container of the compressor.

The invention has the object to further develop a flange of the aforementioned kind, a filter insert of the aforementioned kind, a method of the aforementioned kind, and a device of the aforementioned kind in such a way that the central cutout of the flange is as unobstructed as possible. Moreover, the filter insert should be holdable or liftable ergonomically, in particular with machine power or by a machine, for example, by means of a hoisting crane.

SUMMARY OF THE INVENTION

This object is solved by a flange characterized in that the lifting regions are arranged exclusively in a radially outer region of the central cutout, wherein an imaginary circle, which is arranged coaxially to the flange and whose outer circumference is defined by the radially innermost point of the lifting regions, has a radius which corresponds to at least three fourths of the radius of the additional (second) wall region.

This object is further solved by a filter insert of the aforementioned kind that comprises at least one separating element, configured for separating oil aerosol from air, in the form of a cylinder-shaped coalescer, wherein the separating element is arranged about a support pipe configured for supporting the separating element, and wherein the filter insert comprises a flange embodied in accordance with the invention, wherein the flange is arranged such that the cover region of the flange covers a first axial end face of the separating element and wherein the flange is captively connected with the separating element.

This object is further solved by a device for separating oil aerosol from air, comprising a filter insert in accordance with the invention. The device comprises a cylinder-shaped pressure-resistant housing body with a radially arranged raw air inlet for letting in oil aerosol-laden compressed air of a connecting component; a housing cover, configured for closing off the end face of the housing body, with a clean air outlet arranged coaxially to the flange for letting out the clean air from which the oil aerosol has been separated; an axial end disk for covering the axial end face of the separating element facing away from the flange, wherein the axial end disk comprises an oil collecting region arranged radially within the separating element for collecting the oil that has been separated by the separating element; at least one drainage element for draining the oil separated by the separating element from the device and for returning the oil separated by the separating element to the connecting component. In the position of use of the device for separating oil aerosol from air, the flange region of the flange is contacting the axial end face of the housing body and is clamped between the housing cover and the housing body.

This object is further solved by a method for producing a filter insert embodied in accordance with the invention, wherein:

in a first method step a first flange part, which comprises the flange region, the first wall region, a first part of the cover region, and a first part of the additional (second) wall region, and a second flange part, which comprises a second part of the cover region, a second part of the additional (second) wall region, and the lifting regions, are assembled, wherein in a subsequent method step the assembled flange parts are arranged such at the axial end face of the coalescer separating element that the cover region covers the axial end face of the coalescer separating element, and wherein in a subsequent method step the assembled flange parts and the coalescer separating element are connected captively to each other.

Advantageous configurations and expedient further embodiments of the invention are characterized in the respective dependent claims.

When in the following radial, axial, coaxial or circumferential or the like is mentioned, this relates to the longitudinal axis of the flange, if nothing else is mentioned.

In principle, the invention is based on the lifting regions being arranged only in a radially outer region of the central cutout of the flange. In this context, the lifting regions are configured such and arranged such that the diameter of a free surface area, framed by the lifting elements, of the central cutout of the flange amounts to at least three fourths, in particular at least seven eighths, of the diameter of the additional (second) annular wall element. This has the advantage that at least one drainage element for guiding the oil separated by the filter insert can be arranged in the central cutout of the flange. For example, the drainage element can be arranged such that it extends through the central cutout of the flange and serves for discharging the oil that has been separated by the filter insert. The oil that has been separated by the filter insert collects in a region facing away from the flange in the interior of the filter insert. The drainage element extends thus through the central cutout of the flange and through a central hollow region of the filter insert all the way to the end face facing away from the flange or the bottom end face of the filter insert. The drainage element is advantageously configured to pump out the oil collected in the interior of the filter insert and to supply it again to the connecting component.

The flange according to the invention can be designed as one piece or monolithic.

As an alternative, the flange according to the invention can be of a multi-part configuration, in particular of a two-part configuration, wherein a first flange part comprises the flange region, the first wall region, a first part of the cover region, and a first part of the additional (second) wall region, and a second flange part comprises a second part of the cover region, a second part of the additional (second) wall region, and the lifting regions.

The multi-part configuration of the flange has the advantage that the first flange part can be configured like a known prior art flange of a filter insert of an air-oil separator without lifting element.

The second flange part is advantageously arrangeable at the first flange part, in particular insertable into a central cutout of the first flange part. For example, the second flange part can be configured as an insertion ring for a standard flange of an air-oil separator, for example, an air-oil separator of a pressure container of a compressor.

The second flange part is advantageously of a one-piece configuration. According to an advantageous embodiment of the invention, the second flange part is an insertion ring configured for insertion into a radially inner cutout of the first flange part and provided with integrated lifting regions or integrated lifting geometries.

Advantageously, in regard to this insertion ring, the second part of the cover region is embodied to be placed onto the first part of the cover region. In an advantageous embodiment of the invention, when combining the two flange parts, a second part of the cover region correlated with the second flange part is thus placed onto a first part of the cover region correlated with the first flange part.

Advantageously, the second flange part is fixedly connectable with the first flange part. In an advantageous embodiment of the invention, the second flange part is thus fixedly connected with the first flange part. This connection can be realized, for example, by adhesive. In addition to adhesive, also other connecting techniques are possible, for example, a crimp connection or a clamping connection.

The flange, in particular the first flange part and the second flange part, is preferably substantially formed of at least one metallic material. This has the advantage that the flange is stable and that electrostatic charges can be discharged through the flange.

In order to prevent a vertical tilting when lifting the flange, the flange advantageously comprises at least three lifting regions which are arranged symmetrically about the central cutout of the flange. For example, the flange can comprise an uneven number of lifting regions.

In order to keep the central cutout of the flange as wide open as possible, the lifting regions are advantageously arranged displaced relative to each other such that a lifting region is arranged at most at one of two oppositely positioned points of the additional (second) wall region surrounding the central cutout of the flange.

Advantageously, the lifting regions are designed as part-circular tabs. Such tabs provide good points of attack for a mechanical lifting action of the flange.

For fastening, in particular for hooking, at least one holding element of a lifting machine, in particular a hoisting crane, the lifting regions each advantageously comprise at least one fastening cutout, in particular at least one hole.

In order to obtain a multi-stage filtering action, the separating element of the filter insert can comprise at least two separating media arranged in flow direction one behind the other, for example, a main separator and a post separator. Main separator and post separator can be formed of the same filter material or of different materials. As a separating medium, the filter insert can comprise, for example, glass fiber and/or plastic material, for example, nonwoven.

The respective separating medium is arranged in an annular shape about a correlated support pipe. The main separator, for example, can be wound multiple times in an annular shape about a main separator support pipe and the post separator, for example, can be arranged as a single layer about the post separator support tube.

The device for separating oil aerosol from air is advantageously an air-oil separator which is exchangeably arranged in a pressure storage container of a compressor. This air-oil separator is configured for separation of oil from raw air which originates from the compressor. Moreover, the air-oil separator is advantageously configured to return the purified clean air as well as the oil separated by the filter insert to the compressor.

BRIEF DESCRIPTION OF THE DRAWINGS

As already explained above, there are various possibilities to configure and further develop the teaching of the invention in an advantageous way. For this purpose, on the one hand, reference is being had to the dependent claims; on the other hand, further embodiments, features, and advantages of the invention will be explained in more detail in the following, inter alia with the aid of the embodiment illustrated in FIGS. 1 to 9.

Same or similar configurations, elements or features are provided in FIGS. 1 to 12 with identical reference characters.

DESCRIPTION OF PREFERRED EMBODIMENTS

Figure 1:
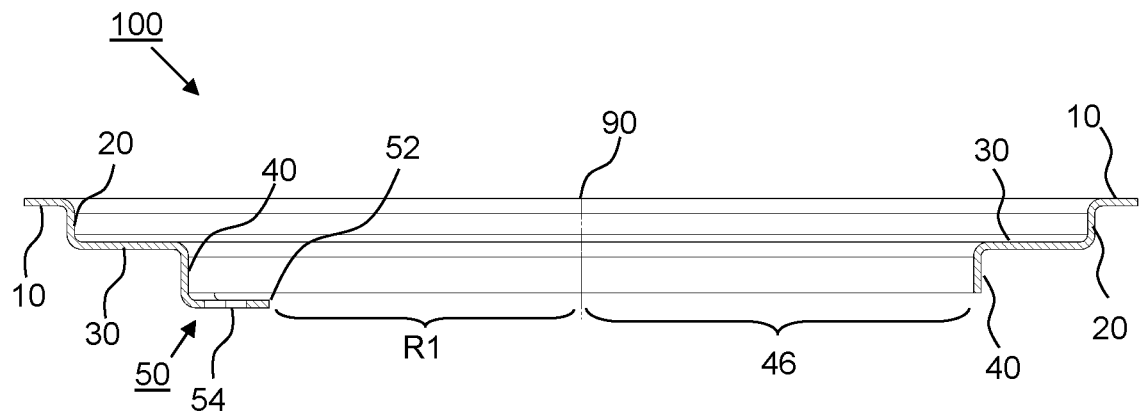
FIG. 1 shows in schematic cross section illustration an embodiment of a flange according to the invention, wherein this flange has been produced in accordance with the method according to the invention.
Figure 2:
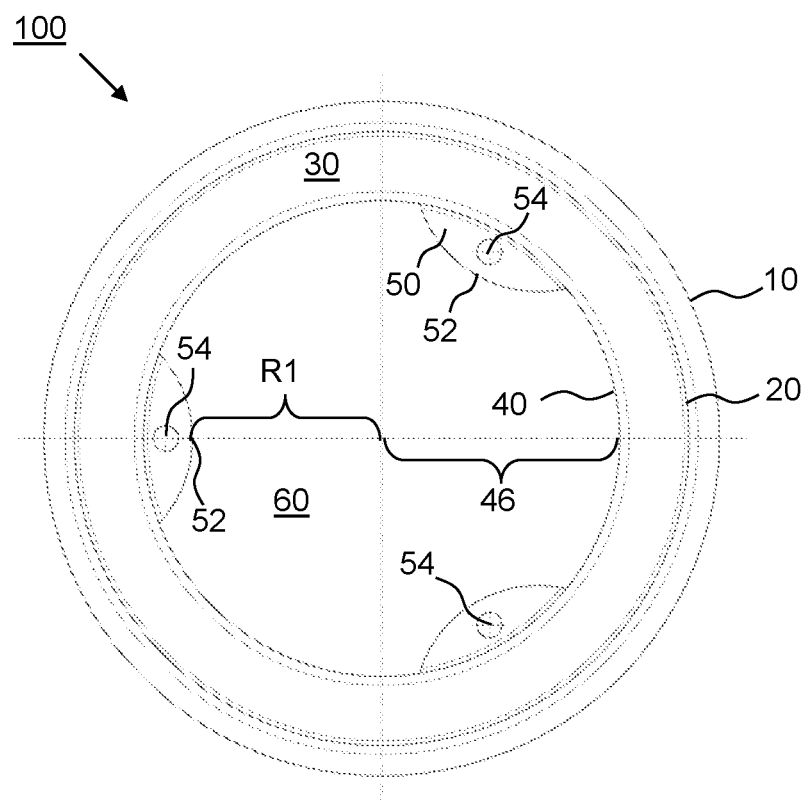
FIG. 2 is a plan view of the flange of FIG. 1, in particular of a side of the flange of FIG. 1 which is facing away from the filter insert in the position of use.
Figure 3:
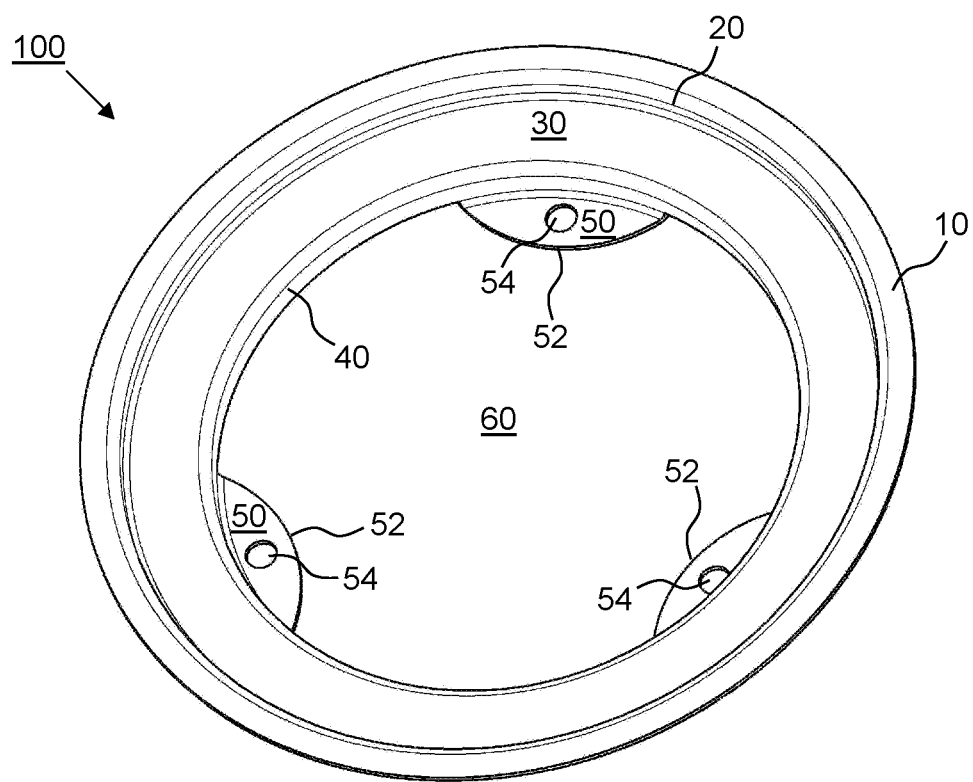
FIG. 3 is an isometric illustration of the flange of FIG. 1.

FIGS. 1, 2, 3, and 8 show an embodiment of a flange 100 configured in accordance with the invention. This flange 100 can be comprised of a first flange part 70 (compare FIG. 7) and a second flange part 80 (compare FIGS. 4 to 6). In the assembled state, the first flange part 70 and the second flange part 80 are connected to each other fixedly or non-detachably (compare FIGS. 1, 2, 3, and 8).

Alternatively, the flange 100 illustrated in FIGS. 1, 2, 3, 8, and 9 can be designed as one piece and can comprise the regions concentrically arranged relative to the each other, i.e., a flange region (10), a first wall region (20), a cover region (30; 32, 34), an additional (second) wall region (40; 42, 44), and at least two lifting regions (50) configured for holding the flange (100).

Figure 7:
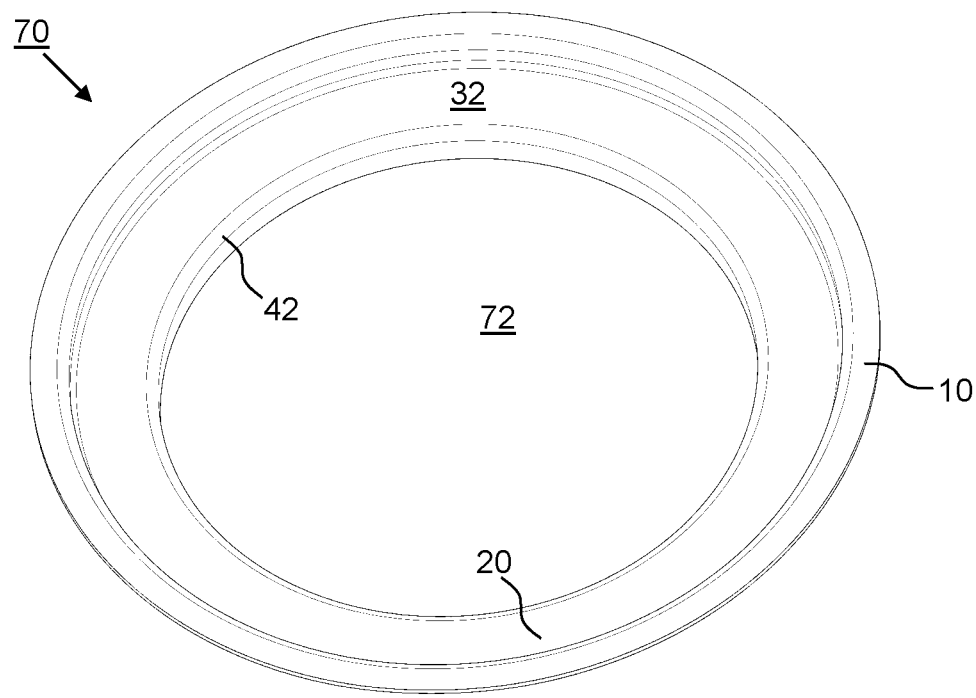
FIG. 7 shows in isometric illustration a first flange part of the flange of FIG. 1.
Figure 8:
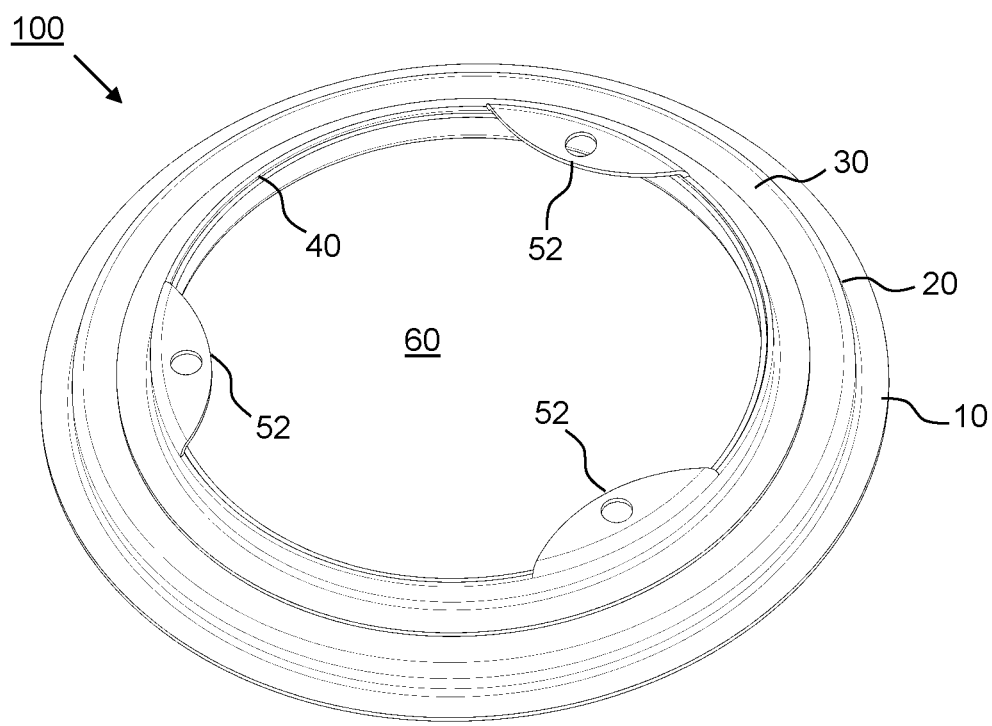
FIG. 8 shows a side of the flange of FIG. 1 which is facing the filter insert in the position of use.

The first flange part 70 illustrated in FIG. 7 is embodied like a known prior art flange, without lifting element, of a filter insert of an air-oil separator. This first flange part 70 comprises an annular flange region 10. This flange region 10 is configured for supporting the flange and is clampable between a housing cover or a pressure container top part 320 and an end face housing wall 340 of a cylinder-shaped pressure-resistant housing body or pressure container bottom part 310 (compare FIG. 9).

Figure 9:
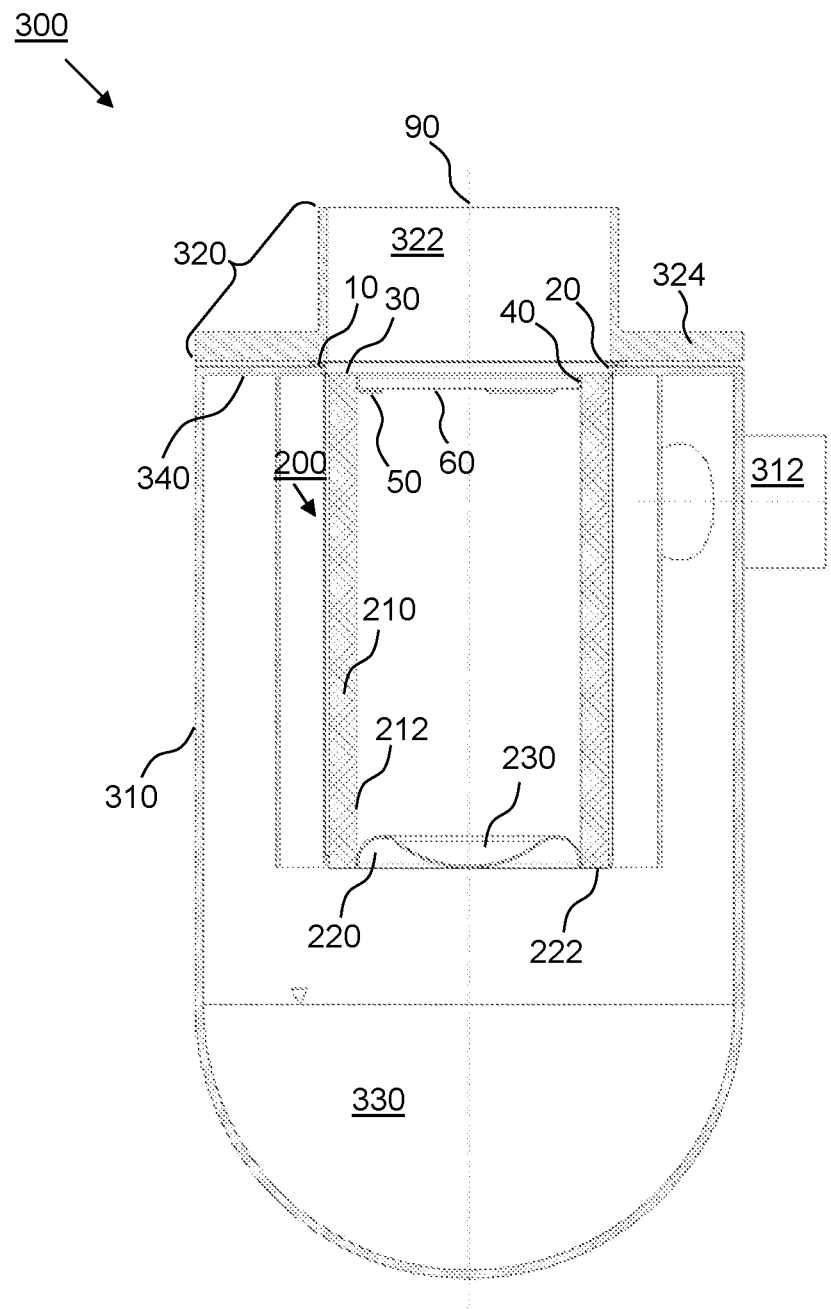
FIG. 9 shows in schematic longitudinal section illustration an embodiment of a device for separating oil aerosol from air embodied in accordance with the invention, wherein the filter insert of this device comprises the flange of FIG. 1.

FIG. 9 shows an embodiment for a device 300 embodied according to the invention for separating oil aerosol from air, i.e., an air-oil separator 200 which is exchangeably arranged in a pressure container or pressure storage container and which comprises the flange 100 of FIG. 1. The air-oil separator 200 can be employed, for example, for oil removal from compressed air in compressed air systems which are being supplied through an oil-lubricated connecting element, for example, of a compressor or of a vacuum pump.

For separating oil aerosol from air, the air-oil separator 200 comprises at least one separating element 210 in the form of a cylinder-shaped coalescer. The raw air flowing in through raw air inlet 312 which is radially arranged at the pressure container bottom part 310 flows through the separating element 210 from the exterior to the interior in radial direction. In order for the separator element 210 to be able to withstand the pressure of the flowing airstream passing through the separating element and to maintain its shape, the separating element 210 is arranged about a support pipe 212. This support pipe 212 is usually embodied of a perforated sheet metal provided with air passages or of an expanded metal provided with air passages.

The purified clean air flows in axial direction out of the pressure container. For discharging the clean air, the housing cover 320 of the pressure container has a central clean air outlet 322. As shown in FIG. 9, the axial clean air outlet 322 can be embodied like a pipe.

The oil which is separated by the separating element 210 of the filter insert 200 collects in the interior of the cylinder-shaped separating element 210 in a bottom end disk 220 of the filter insert 200, in particular in an oil collecting region 230 of the bottom end disk 220 which is arranged radially inside of the separating element 210, and is pumped out through a drainage conduit, not illustrated, and returned to the connecting component.

Oil which has been separated by a preseparation of the pressure container, in particular by force of gravity and by centrifugal force by tangential inflow of the raw air, collects at the bottom of the housing body or pressure container bottom part 310 in a bottom-associated oil collecting volume 330.

In addition to the clean air outlet 322, the housing cover 320 furthermore comprises a radially extending housing cover wall region 324. In the embodiment illustrated in FIG. 9, clean air outlet 322 and housing cover wall region 324 are arranged substantially perpendicular or at a right angle relative to each other. In cross section, clean air outlet 322 and housing cover wall region 324 form the shape of a T standing on its head.

The housing cover wall region 324 connects the clean air outlet 322 and the cylinder-shaped housing body 310. The housing cover 320 can thus be a connecting socket embodied for connecting a clean air outlet pipe 322 to the housing body 310.

The flange region 10 of the first flange element 70 is a contact surface which is configured to support the flange 100 at an end face housing wall 340 of the housing body 310. This end face housing wall 340 extends from a wall surface of the cylindrical housing body 310 in radial direction inwardly. For insertion of the flange 100, the end face housing wall 340 comprises a central cutout.

An annular first wall region 20 adjoins the flange region 10 and extends substantially perpendicular or at a right angle to the flange region 10. The air-oil separator 200 is arranged in such a way in the pressure container that the wall region 20 of the flange 100 which is extending axially is contacting the radial inner region of the end face housing wall 340 of the housing body 310.

As shown in FIG. 7, a first part 32 (first cover region element 32) of the cover region 30 adjoins the end of the first wall region 20 which is facing away from the flange region 10. This first cover region element 32 of the cover region 30 is embodied annular, in particular with an annular disk shape, and extends substantially parallel to the flange region 10, i.e., substantially radially.

A first part 42 (first additional wall region element 42) of the additional (second) wall region 40 of the flange 100 adjoins the radial inner end of the first cover region element 32 of the cover region 30. This first additional wall region element 42 of the additional (second) wall region 40 of the flange 100 is arranged concentric to the first wall region 20, is embodied with an annular shape, and extends substantially perpendicular to the flange region 10.

The air-oil separator 200 is arranged in such a way in the pressure container that the first cover region element 32 of the cover region 30 of the flange 100 is contacting an axial end face of a hollow cylindrical separating element 210. The first additional wall region element 42 of the additional (second) wall region 40 of the flange 100 is resting against a radially inner wall side of the hollow cylindrical separating element 210.

The first cover region element 32 of the cover region 30 and the first additional wall region element 42 of the additional (second) wall element 40 of the flange 100 are connected captively with the separating element 210. The first cover region element 32 of the cover region 30 is preferably positioned at a right angle to the first additional wall region element 42 of the additional (second) wall region 40. In cross section, the first cover region element 32 and the first additional wall region element 42 advantageously form the shape of a reclined L. This L shape is particularly advantageous because it enables an axial as well as radial contact surface relative to the separating element 210. Thus, the L-shape, for example, can be used like an adhesive chamber embodied for arranging an adhesive.

Figure 4:
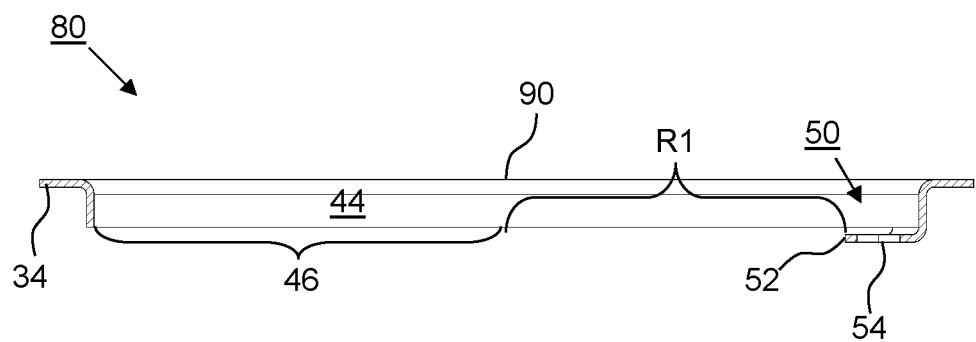
FIG. 4 shows in schematic cross section illustration a second flange part of the flange of FIG. 1 comprising the lifting regions.
Figure 5:
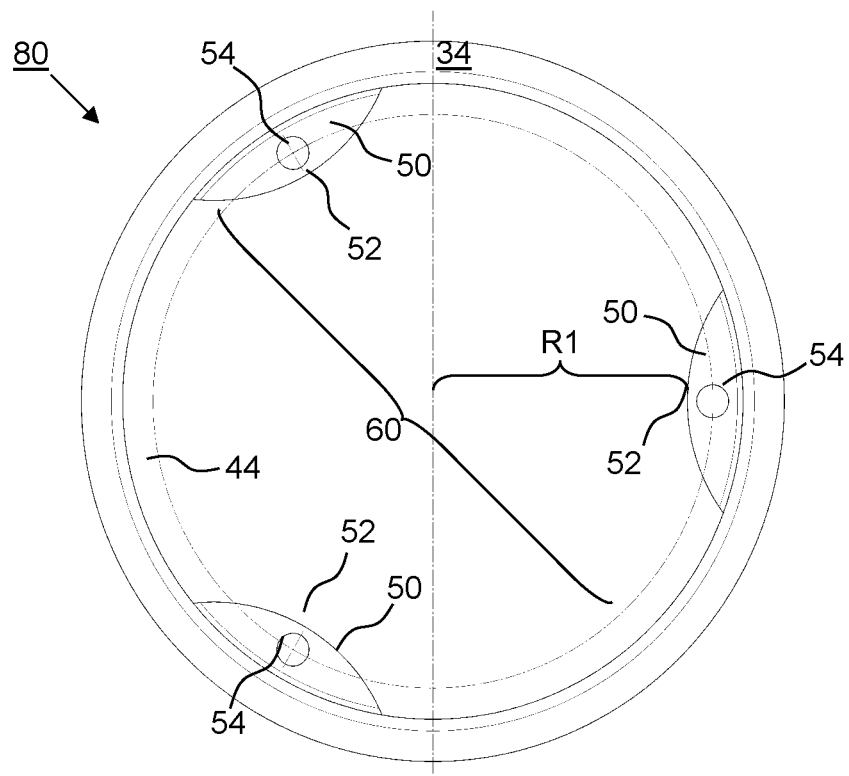
FIG. 5 is a plan view of the second flange part of the flange of FIG. 1.
Figure 6:
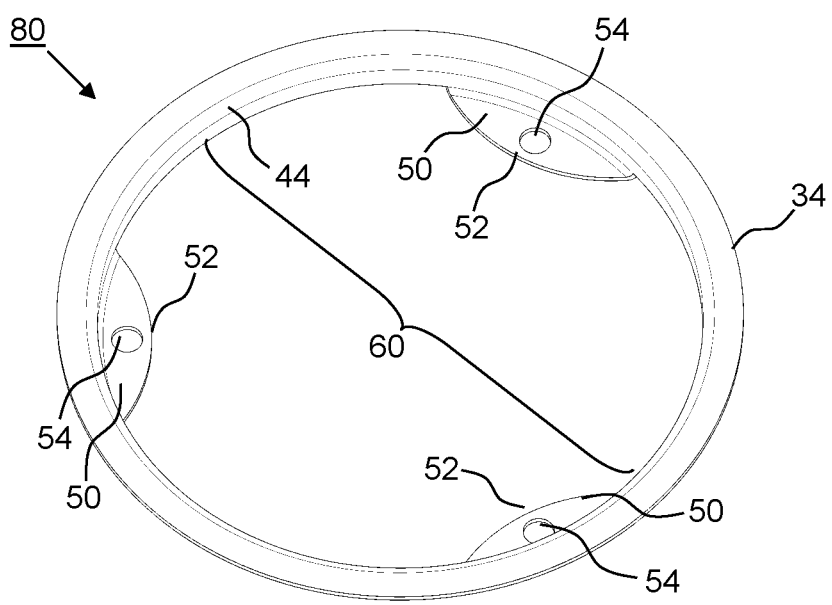
FIG. 6 shows in isometric illustration the second flange part of the flange of FIG. 1.

As illustrated in FIGS. 4 to 6, the second flange part 80 is substantially embodied with an annular shape. It comprises a second cover region element 34, a second part 44 (second additional wall region element 44) of the additional (second) wall region 40, and three lifting regions 50.

The second flange part 80 is configured as an insertion ring insertable into a central cutout of the first flange part 70. In this context, the second cover region element 34 is designed in a shape comparable to the first cover region element 32 and can be arranged on the first cover region element 32. The second additional wall region element 44 is designed in a shape comparable to the first additional wall region element 42 and is resting in the assembled state directly at the first additional wall region element 42.

The lifting regions 50 adjoin the end of the second additional wall region element 44 which is facing away from the second cover region element 34 and extend substantially radially into the central cutout 60 of the flange 100. The lifting regions 50 extend thus substantially parallel to the flange region 10.

The second flange part 80 illustrated in FIGS. 4 to 6 comprises lifting elements 50 which are arranged at three points of the annular second flange part 80. In this context, the lifting elements 50 are designed as perforated tabs. In the device 300 for separating oil aerosol from air illustrated in FIG. 9, the filter insert 200 can be lifted by means of the perforated lifting elements 50 with a hoisting crane out of the connecting element, for example, out of a compressor.

The lifting elements 50 of the second flange part 80 of the flange 100 of the invention are arranged exclusively in an outer region of the central cutout 60 of the flange 100. The central cutout 60 of the flange 100 is thus kept unobstructed as much as possible.

Figure 10:
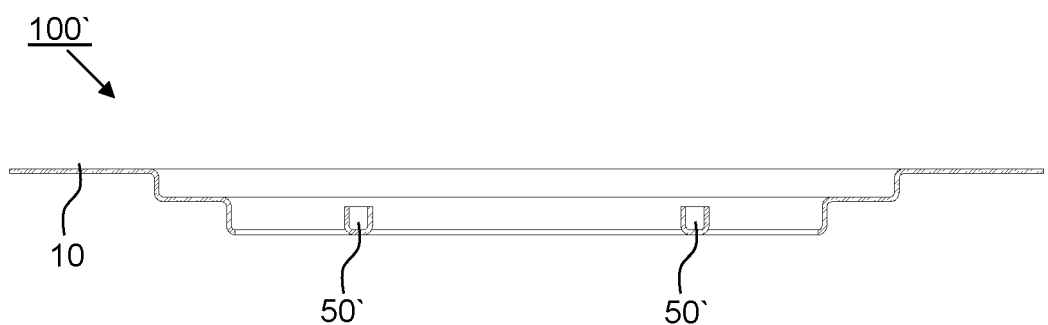
FIG. 10 shows in schematic cross section illustration a prior art flange.
Figure 11:
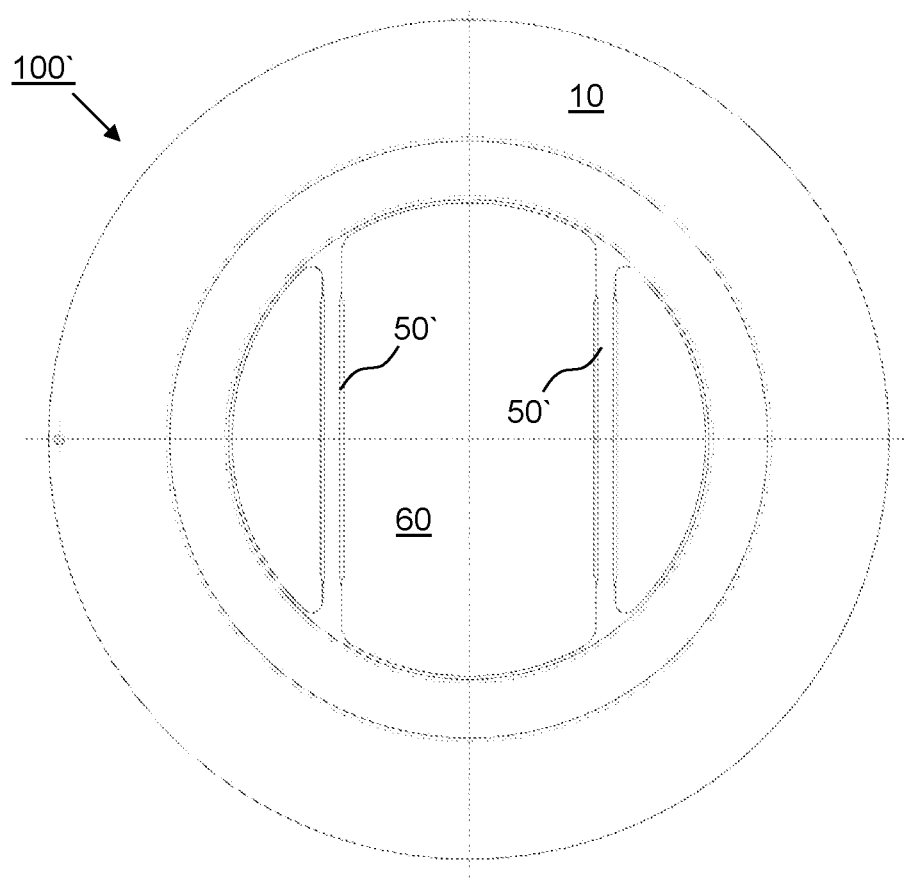
FIG. 11 shows a plan view of the flange of FIG. 10.
Figure 12:
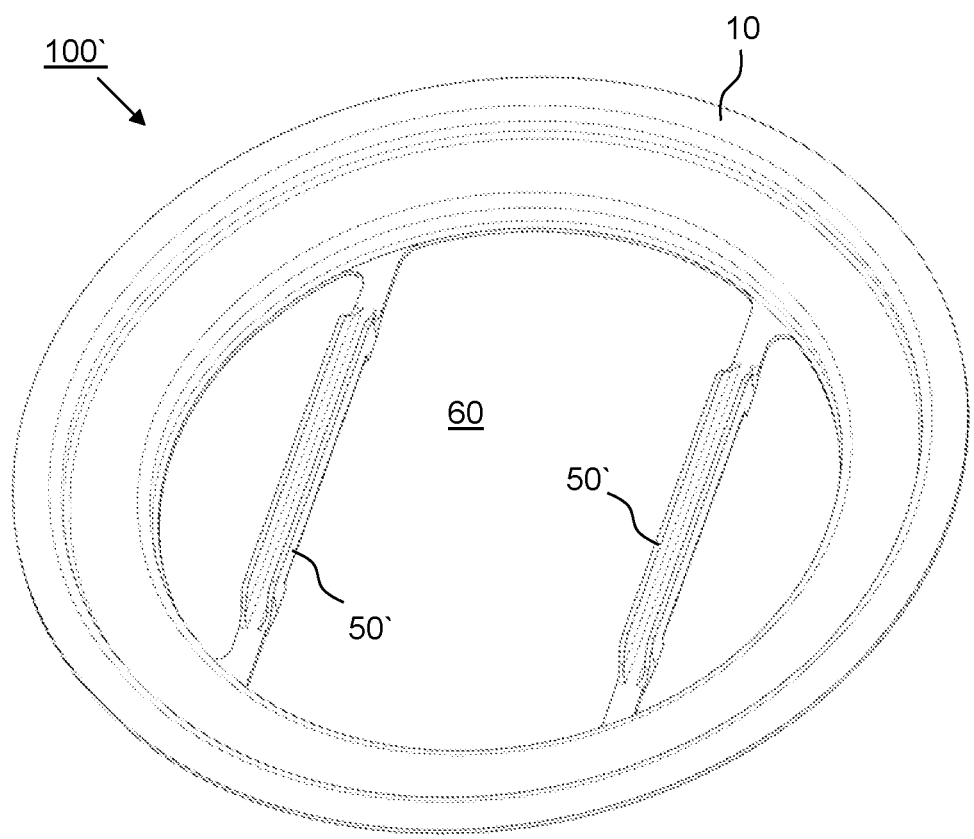
FIG. 12 shows the flange of FIG. 10 in isometric illustration.

In the prior art flange 100' illustrated in FIGS. 10 to 12, lifting grips 50' are attached at four points wherein two of the fastening points are positioned opposite to each other, respectively. The known prior art lifting grips 50' are transverse stays which pass through the entire diameter of the central cutout of the flange 100' and thus obstruct it. Moreover, in the flange 100' illustrated in FIGS. 10 to 12 the lifting grips 50' can only be held by hand and not by means of a hoisting crane.

While specific embodiments of the invention have been shown and described in detail to illustrate the inventive principles, it will be understood that the invention may be embodied otherwise without departing from such principles.

LIST OF REFERENCE CHARACTERS 10 flange region or contact region of the flange 100
20 first wall region, in particular first collar, of the flange 100
30 cover region for covering an axial end face of the separating element 210, in particular one-piece cover region or cover region assembled of at least two parts 32, 34, for example, adhesive region, e.g., adhesive chamber, for arranging adhesive, e.g. glue, for connecting flange 100 and filter insert 200
32 a first part of the cover region 30 correlated with the first flange part 70 of the flange 100, in particular first cover region element 32 (compare FIG. 7)
34 a second part of the cover region 30 correlated with a second flange part 80 of the flange 100, in particular second cover region element (compare FIGS. 4 to 6)
40 second wall region of the flange 100, in particular one-piece second wall region or second wall region of the flange 100 assembled of at least two parts 42, 44
42 a first part of the second wall region 40 correlated with the first flange part 70 of the flange 100, in particular first additional wall region element (compare FIG. 7)
44 a second part of the second wall region 40 correlated with a second flange part 80 of the flange 100, in particular second additional wall region element (compare FIGS. 4 to 6)
46 radius of the second wall region 40 (compare FIGS. 1, 2, 4, 5)
50 lifting region of the flange 100 of the invention (compare FIGS. 1 through 9)
50' lifting region of the flange 100' according to the prior art (compare FIGS. 10 to 12)
52 radially innermost point of the respective lifting regions 50 or region of the respective lifting regions 50 extending farthest into the concentric central cutout 60
54 fastening cutout of the lifting regions 50

60 central cutout of the flange 100, in particular concentric opening of the flange 100
70 first flange part of the flange 100 (compare FIG. 7)
72 central cutout of the first flange part 70
80 second flange part of the flange 100, in particular insertion element or insertion ring (compare FIGS. 4 to 6)
90 longitudinal axis of the flange 100 (compare FIGS. 1, 4, 9)
100 flange, in particular end face end disk of the filter insert 200, according to the invention (compare FIGS. 1 to 9)
100' flange, in particular end face end disk of the filter insert 200, according to the prior art (compare FIGS. 10 to 12)
200 filter insert, in particular air-oil separator (compare FIG. 9)
210 separating element in the form of a cylindrical coalescer, in particular of glass fiber and/or plastic material, for example, nonwoven, configured for separating oil aerosol from air (compare FIG. 9)
212 support pipe
220 axial end disk for covering the axial end face of the separating element 210 facing away from the flange 100, in particular bottom end disk or bottom end cap or bottom element for covering the hollow cylindrical bottom side of the filter insert 200 (compare FIG. 9)
222 axial recess of the axial end disk 220, in particular a depression of the axial end disk 220 that in cross section is U-shaped or semi-circular and in plan view is circular or annular, for example, a cup of the axial end disk 220 (compare FIG. 9)
230 oil collecting region which is correlated with the axial end disk 220, is arranged radially within the separating element 210, and is configured for collecting the oil that has been separated by the separating element 210, (compare FIG. 9)
300 device for separating oil aerosol from air, in particular air-oil separator arranged exchangeably in a pressure container or pressure storage container (compare FIG. 9)
310 cylinder-shaped pressure-resistant housing body or pressure container bottom part or pressure storage container bottom part (compare FIG. 9)
312 raw air inlet (compare FIG. 9)
320 housing cover or pressure container cover or pressure storage container cover, in particular housing socket, (compare FIG. 9)
322 clean air outlet, in particular clean air outlet pipe or pipe-like clean air conduit (compare FIG. 9)
324 radially extending housing cover wall region (compare FIG. 9)
330 oil collecting volume or oil collecting chamber for collecting oil that has been separated by preseparation, in particular by the force of gravity and/or by centrifugal force by tangential inflow of the raw air into the housing body 310 (compare FIG. 9)
340 end face housing wall of the cylinder-shaped housing body 310 (compare FIG. 9)
R1 radius of an imaginary circle which is arranged coaxially to the flange 100 and whose outer circumference is defined by the radially innermost point 52 of the lifting regions 50 (compare FIGS. 1, 2, 4, 5)

What is claimed is:

1. A filter insert for installation in a device for separating oil aerosol from air, the filter insert comprising:
at least one separating element configured to separate oil aerosol from air, wherein the at least one separating element is a cylindrical coalescer;
a support pipe, wherein the at least one separating element is arranged about the support pipe and the support pipe supports the at least one separating element;
a flange comprising: a flange region comprising a contact surface configured to support the flange, wherein the flange region extends radially relative to a longitudinal axis of the flange; a first wall region adjoining the flange region radially inwardly, wherein the first wall region extends axially; a cover region adjoining an end of the first wall region facing away from the flange region, wherein the cover region extends radially inwardly; a second wall region adjoining radially inwardly the cover region, wherein the second wall region extends axially and surrounds a central cutout of the flange; two or more lifting regions configured for holding the flange, wherein the lifting regions adjoin an end of the second wall region facing away from the cover region, wherein the lifting regions extend radially inwardly into the central cutout of the flange; wherein the first wall region, the cover region, and the second wall region are arranged concentrically relative to each other about the longitudinal axis of the flange, wherein the flange is annular and, viewed in a longitudinal section along the longitudinal axis, comprises a stepped configuration; wherein the lifting regions are arranged exclusively in a radially outer region of the central cutout; wherein an imaginary circle, arranged coaxially to the longitudinal axis of the flange and comprising an outer circumference defined by a radially innermost point of the lifting regions, has a radius corresponding to at least three fourths of a radius of the second wall region;
wherein the flange is arranged such that the cover region of the flange covers a first axial end face of the at least one separating element and wherein the flange is captively connected with the at least one separating element.

2. A device for separating oil aerosol from air, the device comprising:
a cylinder-shaped pressure-resistant housing body comprising a radially arranged raw air inlet for letting in oil aerosol-laden compressed air of a connecting component;
a filter insert according to claim 1 disposed in the housing body;
a housing cover configured to close off an axial end face of the housing body, the housing cover comprising a clean air outlet arranged coaxially relative to the flange of the filter insert for letting out clean air from which the oil aerosol has been separated;
an axial end disk covering an axial end face of the at least one separating element of the filter insert, wherein the axial end face is facing away from the flange of the filter insert, wherein the axial end disk comprises an oil collecting region arranged radially within the at least one separating element and configured to collect oil that has been separated by the at least one separating element;
at least one drainage element configured to drain the oil that has been separated by the at least one separating element from the device and to return the oil that has been separated by the separating element to the connecting component;
wherein, in a position of use of the device, the flange region of the flange of the filter insert contacts the axial end face of the housing body and is clamped between the housing cover and the housing body.

3. The device according to claim 2, wherein the connecting component is a compressor or a vacuum pump.

4. A method for producing a filter insert according to claim 1, the method comprising:

assembling a first flange part, comprising the flange region, the first wall region, a first part of the cover region, and a first part of the second wall region, and a second flange part, comprising a second part of the cover region, a second part of the second wall region, and the lifting regions, to assembled first and second flange parts;

subsequently, arranging the assembled first and second flange parts at the axial end face of the at least one separating element such that the cover region covers the axial end face of the at least one separating element;

subsequently, connecting captively the assembled first and second flange parts and the at least one separating element to each other.

5. The method according to claim 4, wherein assembling includes placing the second part of the cover region of the second flange part onto the first part of the cover region of the first flange part and fixedly connecting the second part of the cover region of the second flange part to the first part of the cover region of the first flange part.

* * * * *